No. 876,289. PATENTED JAN. 7, 1908.
F. H. BELLAMY.
HORSE COLLAR.
APPLICATION FILED APR. 8, 1907.
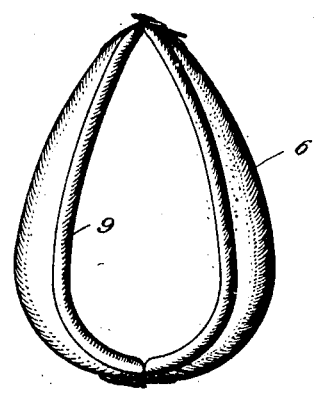
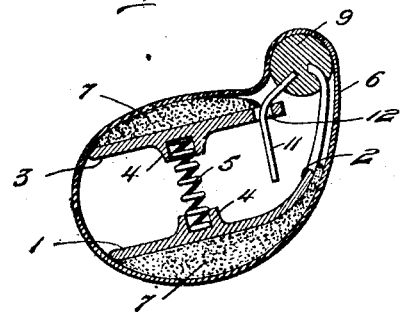
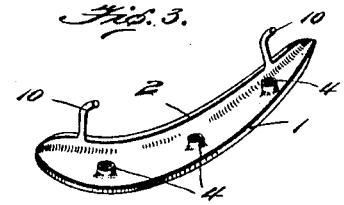
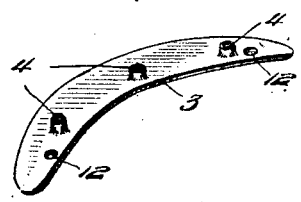
WITNESSES:
INVENTOR
F. H. Bellamy
BY
Attorney

UNITED STATES PATENT OFFICE.

FRANCIS HENRY BELLAMY, OF BIG SANDY, TENNESSEE, ASSIGNOR TO JAMES C. PERKINS, OF BIG SANDY, TENNESSEE.

HORSE-COLLAR.

No. 876,289.  Specification of Letters Patent.  Patented Jan. 7, 1908.

Application filed April 8, 1907. Serial No. 367,017.

*To all whom it may concern:*

Be it known that FRANCIS HENRY BELLAMY, a citizen of the United States, residing at Big Sandy, in the county of Benton and State of Tennessee, have invented certain new and useful Improvements in Horse-Collars, of which the following is a specification.

My invention relates to improvements in horse collars, and has for its object, the provision of a cushioned collar of strong and simple construction which will relieve the horse of all strains, jolts and jerks, thereby saving the horse and at the same time prolonging the life of the harness and adjuncts.

Another object of my invention is the provision of a shock-absorbing horse collar which shall be thoroughly practical and efficient in every particular.

With these and other objects in view, my invention consists of oppositely-disposed collar plates inclosed in a sheathing or covering, the plates being spaced apart by shock-absorbing springs, the plates having seats for the reception of the ends of the springs, and pads interposed between the plates and the sheathing.

The invention further consists of a horse collar embodying certain other novel features of construction, combination and arrangement of parts substantially as disclosed herein and as illustrated in the accompanying drawings, in which:

Figure 1, is a front or face view of a collar constructed in accordance with and embody my invention. Fig. 2 is a cross sectional view of the collar. Fig. 3, is a detail view of one of the lower or innermost collar plates. Fig. 4, is a like view of one of the upper collar plates.

The collar consists of a pair each of lower and upper plates, the lower or innermost plates 1, being rounded and pointed to conform to the shape of one side of an ordinary horse collar and having its inner edge flared upwardly or flanged as at 2, to the curvature of the animal's neck. The upper plates 3, are substantially flat and are of practically the same longitudinal shape as the lower ones.

Annular or raised sockets 4, are provided at opposite points on the opposing faces of the upper and lower plates in each pair, and seated in said sockets and tending to space the plates apart are the coiled springs 5. Three spacing springs are generally used between each pair of plates but the number and the tension of the springs may be varied according as to whether the collar is to be used for heavy draft or for light draft purposes.

A sheathing or covering 6 of the usual horse collar shape completely incloses the collar plates, and pads 7, are interposed between the plates and the cover, so that the metal does not bear direct upon the outer cover and by this construction no packing or filling material is necessary. The usual rim 9, is secured to the inner edge of the body portion of the collar, and hooks 10, on the lower plates are engaged in the rim to secure the plates against movement with respect to the rim. Hooks 11, are also secured in the rim which have their free ends passing through openings 12 in the upper plates, so as to serve as guides to limit the movement of the upper or cushioning plates. By this means, the lower plates are fixedly anchored to the rim, and the upper cushioning plates are loosely connected thereto, so that any undue pressure on the collar causes the upper plates to give with a cushioning effect thereby serving to relieve the animal and trappings of all strain.

From the foregoing description taken in connection with the drawings, it will be apparent that I have produced a practical cushion or shock-absorbing collar which accomplishes all the results herein set forth as the objects of my invention.

I claim:

1. An animal collar comprising a cover and a rim secured thereto, a pair of collar plates anchored to said rim, a pair of cushion plates located opposite the first named plates and loosely secured to the rim, and cushion springs confined between the plates.

2. A horse collar comprising a cover or casing, a rim carried thereby, a pair of stationary collar plates anchored to said rim, a pair of relatively movable cushion plates loosely secured to the rim, sockets provided on the opposing faces of the stationary and movable plates, spacing springs between the plates having their ends engaged in the sockets and pads interposed between the plates and casing.

In testimony whereof I affix my signature in presence of two witnesses.

FRANCIS HENRY BELLAMY.

Witnesses:
 WILL DAVIS,
 JOHN HAWLEY.